(12) United States Patent
Herderich et al.

(10) Patent No.: US 8,729,888 B2
(45) Date of Patent: May 20, 2014

(54) MAGNETIC TRANSDUCER CONFIGURATION FOR MAGNET-BASED POSITION SENSORS HAVING IMPROVED GEOMETRY FOR MORE PRECISE POSITION DETECTION

(75) Inventors: Hans-Juergen Herderich, Kernen (DE); Steffen Waldenmeier, Kieselbronn (DE); Patrick Calandrini, Ludwigsburg (DE); Andrea Deflorio, Stuttgart (DE); Olivier Kukawka, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 370 days.

(21) Appl. No.: 13/051,252

(22) Filed: Mar. 18, 2011

(65) Prior Publication Data
US 2011/0234207 A1    Sep. 29, 2011

(30) Foreign Application Priority Data
Mar. 23, 2010    (DE) .......................... 10 2010 003 135

(51) Int. Cl.
G01D 5/18    (2006.01)

(52) U.S. Cl.
USPC .................................. 324/207.2; 324/207.24

(58) Field of Classification Search
USPC .......................................... 324/207.2, 207.24
See application file for complete search history.

(56) References Cited

U.S. PATENT DOCUMENTS

| | | | | |
|---|---|---|---|---|
| 4,616,281 A | * | 10/1986 | Nakamura | ..................... 360/315 |
| 7,088,095 B1 | * | 8/2006 | Busch | ......................... 324/207.2 |
| 2004/0017187 A1 | * | 1/2004 | Van Ostrand et al. | ... 324/207.21 |

* cited by examiner

Primary Examiner — Melissa Koval
Assistant Examiner — Stephen G Armstrong
(74) Attorney, Agent, or Firm — Kenyon & Kenyon LLP

(57) ABSTRACT

A magnetic transducer configuration may include a permanent magnet element magnetized in its longitudinal direction having a pole transition. The permanent magnet element has a cross section in the pole transition section, which is larger than the cross section of the permanent magnet element in an area outside of the pole transition section. A magnetic position sensor may include a magnetic field sensor array and magnetic transducer configuration. The magnetic field sensor array and the magnetic transducer configuration are situated displaceably in the longitudinal direction in a plane-parallel manner. The magnetic field sensor array has at least one magnetic field sensor lying in a path along which the permanent magnet element moves during displacement of the magnetic transducer configuration.

12 Claims, 2 Drawing Sheets

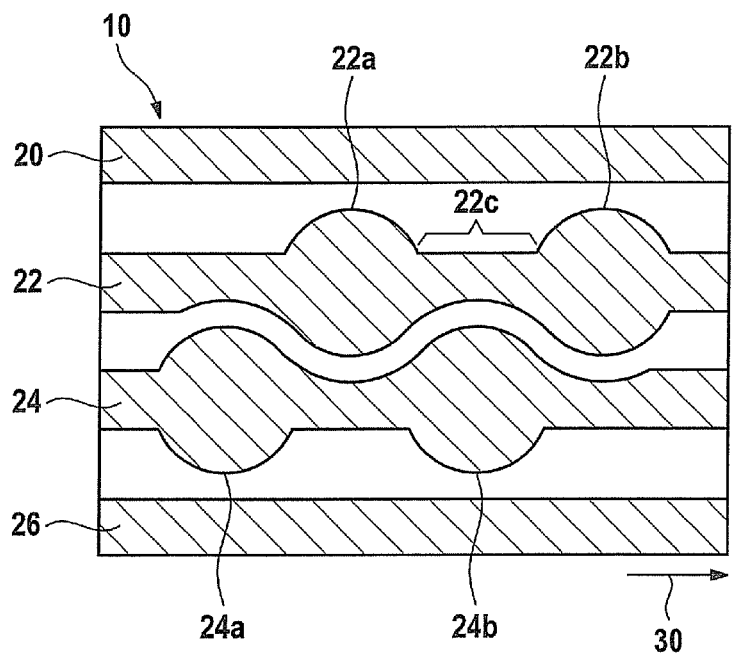
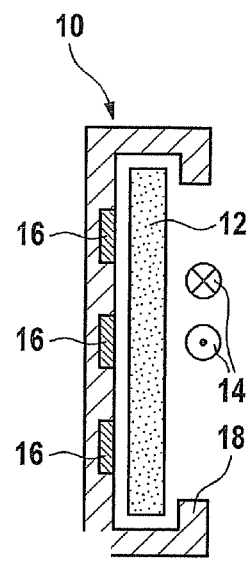
FIG. 1　　FIG. 1.1
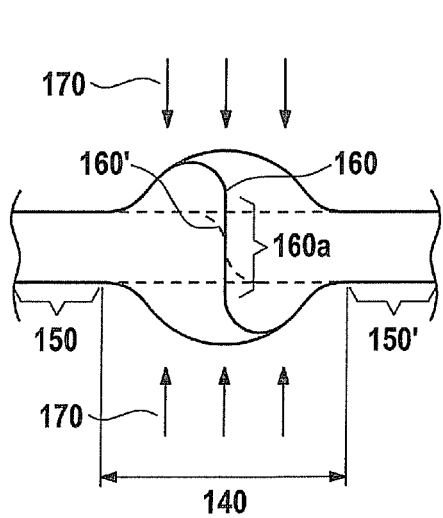
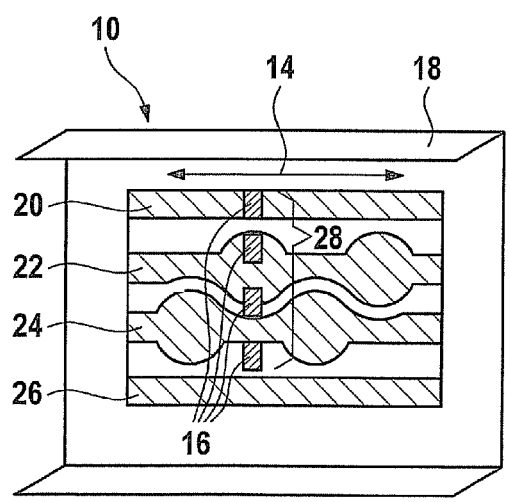
FIG. 2　　FIG. 1.2

MAGNETIC TRANSDUCER CONFIGURATION FOR MAGNET-BASED POSITION SENSORS HAVING IMPROVED GEOMETRY FOR MORE PRECISE POSITION DETECTION

CROSS REFERENCE

The present application claims the benefit under 35 U.S.C. §119 of German Patent Application No. 102010003135.6, filed on Mar. 23, 2010, which is expressly incorporated herein by reference in its entirety.

FIELD OF THE INVENTION

The present invention relates to magnet-based, linear position sensors and in particular an improved magnetic transducer configuration for the same.

BACKGROUND INFORMATION

In the automotive industry, for example, linear position sensors which operate using magnetic transducers and magnetic sensors are widespread. A plurality of permanent magnets having precisely specified pole transitions usually faces a sensor array (usually two-dimensional), the magnetic transducer being displaceable in one direction parallel to the sensors. The sensors are usually Hall sensors and detect a pole transition of the magnetic field permeating the sensors. Since the pole transition of the magnetic transducer configuration corresponds to a defined geometric mark, the position of the magnetic transducer configuration in relation to the sensor array is therefore detectable.

Strip-shaped permanent magnets situated side by side for space-saving reasons are generally used as magnetic transducers, resulting in a mutual influence. The permanent magnet elements are magnetized in the longitudinal direction, the pole transitions being offset from one another so that a magnetized section of a neighboring permanent magnet element is situated at the height of a pole transition of a permanent magnet element, thereby laterally influencing the course of the neighboring pole transition. Since the influence of neighboring magnet elements decreases with distance, the pole transition does not run exactly perpendicularly in the longitudinal course but instead is distorted due to neighboring fields. A further distortion occurs due to the magnetic guidance by the magnetic material, this guidance being stronger at the center of the cross section than at the edge.

The result is therefore not an accurately defined pole transition, the positioning of the magnetic sensor across the longitudinal axis in particular having a strong influence on in which position the pole transition is actually detected.

Conventionally, this inaccuracy may be compensated by an additional complex calibration step after installation of the position sensor or to discard position sensors outside of a tolerance range based on an accurate subsequent measurement. A greater distance between the permanent magnet elements would reduce the distortion but is impossible in numerous applications having a small installation space and a high integration density.

SUMMARY

An object of the present invention is therefore to provide a linear magnetic position sensor which has a higher precision combined with a small space requirement.

The present invention allows a more precise position sensor having definitely lower reject rates. Furthermore, the present invention permits a high integration density which is not impaired by the higher precision. The present invention may be implemented without necessitating additional magnetic material, as is done conventionally.

In accordance with the present invention, the permanent magnet element has a (larger) cross section at the pole transition, whereas in longitudinal sections in which there is no pole transition the permanent magnet element is provided with a smaller cross section in comparison with the cross section at the pole transition.

In general, the cross section is enlarged at locations where the magnetic marks relevant for the position detection are located. The larger cross section at the location which is relevant for the position detection (at the pole transition) makes it possible that the influence due to neighboring permanent magnet elements or due to soft magnet elements distorts the course of the pole transition less than is conventional. The widened cross section results in a longer line characterizing the undistorted course of the pole transition in the permanent magnet element, it having been recognized that the distortion involves only boundary areas of the pole transition, but central areas of this line are less impaired by the influence due to external fields. This yields a longer section of the line, characterizing the pole transition, which runs generally constantly and perpendicularly to the longitudinal direction of the permanent magnet element. Since the section, with the pole transition, runs optimally (i.e., generally perpendicularly to the longitudinal direction), this yields a greater range for the positioning of the sensor in which distortion of the pole transition due to external influences does not result in an error in the position detection.

According to another approach of the present invention, the cross section of the permanent magnet element is smaller in a section outside of the pole transition of the longitudinal section than the cross section at the pole transition of the longitudinal section. This complementary approach pertains to the idea according to the present invention that material outside of the pole transition of the longitudinal section does not contribute directly to the position detection but instead only interferes with neighboring permanent magnet elements or distorts their pole transition. According to one aspect, the cross section at the pole transition may thus be larger than the cross section outside of the pole transition or, complementary to that, the cross section outside of the pole transition of the longitudinal section may be reduced in comparison with the cross section at the pole transition. These two approaches are complementary and result in the following two fundamental characteristics:

In a first characteristic, a conventional permanent magnet element rod is assumed, its pole transition of the longitudinal section being enlarged in comparison with the remainder. In a second characteristic, a conventional rod-shaped permanent magnet element is again assumed, but in one section outside of the pole transition of the longitudinal section, the cross section is reduced (in comparison with the remainder or with the pole transition). This reduction corresponds to a reduced distortion of a pole transition situated nearby.

If the pole transition is therefore regarded as a useful signal of a mark, and sections outside of the pole transition which distort it are regarded as noise (based on this useful signal), then the signal-to-noise ratio is increased by both measures (i.e., enlarging the cross section at the pole transition and reducing the cross section in a section outside of the pole transition). An increased signal/noise ratio corresponds to lower distortion of the course of the pole transition. The section within which the cross section is reduced in comparison with the cross section at the pole transition or at the pole transition of the longitudinal section may extend from the pole transition of the longitudinal section over the entire remaining length of the permanent magnet element or may extend over only a portion of the longitudinal extension of the permanent magnet, so that the remaining longitudinal section does not have the reduced cross section of that section. It is sufficient in particular that only one section outside of the pole transition of the longitudinal section has a reduced cross section, which is situated next to a pole transition or a portion of the pole transition of the longitudinal section of a neighboring permanent magnet element. Due to the extended cross section within this section, it is ensured that the distortion on the neighboring pole transition is reduced according to the present invention, but outside of this section having a reduced cross section, the cross section of the permanent magnet element is essentially freely selectable. A cross section within the pole transition of the longitudinal section or at the pole transition may be enlarged in comparison with a cross section outside of this longitudinal section by the fact that the cross-sectional area is enlarged, only the width of the permanent magnet element is enlarged, or the thickness of the permanent magnet element is enlarged. In particular with the reduction or enlargement of only the width according to the present invention, this yields a particularly high spatial integration density. In the reduction in thickness alone, the magnetic transducer configuration according to the example embodiment of the present invention may be provided, having the usual permanent magnet elements, in which recesses extending over a longitudinal section are provided, these recesses extending over a portion of the thickness but extending over the total width.

The magnetization direction of the permanent magnet element may be regarded as the longitudinal direction, the thickness being understood to be the dimension of the cross section which extends perpendicularly to the plane of extent of the magnetic transducer configuration, and the width being the dimension which extends in the cross section parallel to the plane of extent of the magnetic transducer configuration.

According to another aspect of the present invention, when using a plurality of rails or permanent magnet elements, the sensors may be offset from one another in the longitudinal direction. Such configurations or other configurations of the sensor elements make it possible for the pole transitions of neighboring permanent magnet elements to be offset from one another. This offset makes it possible for the permanent magnet element to be designed to be wider in the pole transition of the longitudinal sections where there is a pole transition, this wider section being located near a magnetic section without a pole transition (based on the offset in the longitudinal direction), so that the magnetic section without a pole transition may be designed to be narrower in order to at least partially accommodate the widened area of the neighboring permanent magnet element. Since the widened areas of the permanent magnet elements, which are parallel to one another, are thus offset from one another, a high integration density is achievable in that wider areas are accommodated in narrower areas of neighboring magnet elements.

The present invention thus provides a magnetic transducer configuration, which is used to create the magnetic field for a corresponding sensor array. The magnetic transducer configuration includes at least one permanent magnet element, which runs planarly and is in the form of a rod, for example. The permanent magnet elements used have a flat, generally square cross section, resulting in the form of strips. The permanent magnet element is magnetized in the longitudinal direction, the longitudinal direction of the magnetization of the permanent magnet element corresponding to the longitudinal direction in which the magnetic transducer configuration is movable in relation to the magnetic sensor array when these are paired with one another. According to an example embodiment of the present invention, the cross section within the pole transition section in which the pole transition is located is enlarged in comparison with the cross section of the permanent magnet element outside of the pole transition of the longitudinal section. The larger cross section allows a longer course of the pole transition, as described above, and thus allows an elongated length of the pole transition, which runs generally perpendicularly to the longitudinal direction and thus no position error occurs due to magnetic field distortions in the event of faulty positioning of the sensor across the magnetic transducer configuration. The pole transition of the longitudinal section may, for example, have a length corresponding to the width of the permanent magnet element inside or outside of the pole transition of the longitudinal section. Outside of the pole transition of the longitudinal section, the width is preferably constant. The maximum cross section inside the pole transition of the longitudinal section preferably occurs at the height of the pole transition, the size of the cross section decreasing continuously with the distance from the pole transition until reaching a cross section corresponding to the constant cross section, which is provided outside of the pole transition of the longitudinal section. The course of the cross section thus increases continuously in the pole transition of the longitudinal section until reaching the pole transition and decreases continuously in the same way. The course of the cross section is thus strictly monotonic. In a complementary manner, a first permanent magnet element in a section near the pole transition of a second neighboring permanent magnet element may have a cross section which is the minimum cross section of the first permanent magnet element. A permanent magnet element may have a plurality of such minimum cross sections.

A larger cross section may be provided through a larger area of the cross section, through a greater width of the magnet element, or through a greater thickness of the magnet element in comparison with locations outside of the pole transition of the longitudinal section. This is true of a smaller cross section accordingly. The thickness is preferably constant and only the width changes according to the present invention. If the thickness of the magnet element changes in the longitudinal direction according to the present invention, this results in more magnetic material being provided for generating the field at the site of the pole transition, with neighboring areas having less material because of the smaller thickness, so that the influence of interference is also lower to the same extent. A similar consideration also applies to the area of the cross section, which is likewise a measure of the amount of magnetic material based on length. If only the width at the pole transition of the longitudinal section is enlarged, then the magnetic transducer configuration may be produced with uniform thickness and is thus completely compatible in comparison with conventional magnetic transducer configurations. In addition, with the enlargement of only the width according to the example embodiment of the present invention, it is apparent that from the perspective of the magnetic sensor, there is a wider range for the configuration of the sensor, the course of the pole transition not being distorted over the entire range and running generally perpendicularly to the longitudinal direction (in contrast with the boundary areas).

In a preferred specific embodiment, either the area of the cross section, the width, or the thickness of the permanent magnet element is larger in the longitudinal area of the pole transition than outside of the pole transition of the longitudinal section. The maximum area, width, or thickness is provided at the pole transition itself. The minimum thickness (i.e., in height) is provided where a pole transition of a neighboring permanent element is located. The area, width, or thickness may be constant at a predefined distance from the pole transition and only then, while still within the pole transition of the longitudinal section, drop to an area, width, or thickness corresponding to the cross-sectional area, width, or thickness of the permanent magnet element outside of the pole transition of the longitudinal section. A constant cross section of the permanent magnet element outside of the pole transition of the longitudinal section, which is designed to be thicker according to the example embodiment of the present invention, is advantageous because of the simpler manufacturing options. This is likewise true of permanent magnet elements whose cross section is constant outside of the section in which the cross section is reduced.

In a preferred specific embodiment, the magnetic transducer configuration includes a plurality of permanent magnet elements, i.e., two or more. Two neighboring permanent magnet elements of the plurality of permanent magnet elements have transitions of the longitudinal sections which are offset in relation to one another in the longitudinal direction. The thickening of the pole transition sections according to the example embodiment of the present invention may thus be accommodated by the neighboring element because it does not have any thickening at this location. The pole transition sections are preferably offset from one another in such a way that no location of a pole transition section is next to a location of a pole transition section of a neighboring permanent magnet element. However, the offset may be adapted to the course of the widths, thicknesses, or cross-sectional areas, so that neighboring pole transition sections partially overlap and have mutually complementary runs intermeshing with one another. The offset may be important in particular in example embodiments of the magnetic transducer configuration according to the present invention, in which only the thickness in the pole transition of the longitudinal section is increased. It is provided in particular that the neighboring permanent magnet elements have longitudinal sections in which the particular widths, cross-sectional areas, or thicknesses of the permanent magnet elements have courses in the longitudinal direction which are complementary to one another. These longitudinal sections are inside the pole transition of the longitudinal section and allow a high area coverage by permanent magnet elements even inside the pole transition of the longitudinal sections. A complementary course is illustrated as an example in FIG. 1. According to another variant, which may be combined herewith, the pole transition of the longitudinal section is situated at least partially at the height of the longitudinal section of a neighboring permanent magnet element, a complementary course of the widths of the permanent magnet elements being situated in this longitudinal section. This is also true of complementary courses of the thicknesses or of the cross-sectional area contents. The trend in these dimensional variables in the longitudinal direction of the permanent magnet element is considered as the course of the widths, thicknesses, or areas. The course is thus a function of a distance in the longitudinal direction of the permanent magnet element.

The present invention is also implemented by a magnetic position sensor having a magnetic field sensor array and the magnetic transducer configuration according to the present invention. The position sensor provides for the magnetic field sensor array to be paired with the magnetic transducer configuration via a longitudinal bearing which has one degree of freedom, for example, a rail having a straight extent and a rotor engaging thereon. This yields a plane-parallel configuration and the possibility of the longitudinal displacement in the longitudinal direction which also corresponds to the longitudinal direction of the magnetization of the permanent magnet elements. The permanent magnet elements themselves have a main axis of symmetry in their physical representation, corresponding to the direction of magnetization, i.e., the longitudinal direction. The magnet field sensor array has at least one magnetic field sensor, which is situated on an (imaginary) path along which the permanent magnet element moves. This movement occurs due to the one linear degree of freedom, so that the path is defined by the movement in particular of the pole transition of the permanent magnet element during displacement of the magnetic transducer configuration with respect to the magnetic field sensor array.

The magnetic field sensor array usually has a plurality of sensors which are similar and are distributed along a plurality of parallel lines, so that the lines correspond to the centers of the paths along which the permanent magnet elements (and the associated pole transitions) move during displacement. The configuration of the magnetic field sensors as well as the configuration of the pole transitions is derived from the intended purpose, the desired resolution, and the distance segments to be detected.

The magnetic field sensor array preferably has one magnetic field sensor for each pole transition. This is situated in the position sensor in such a way that it may detect (at least) one associated pole transition. Furthermore, a plurality of sensors may be provided per pole transition or a plurality of pole transitions may be provided for one and the same sensor. The association of the pole transitions and of the magnetic field sensors and their configuration is dependent on the desired intended purpose.

The magnetic field sensors may be offset from one another in the longitudinal direction or in a direction perpendicular to the longitudinal direction (along a transverse axis). In the case of a plurality of magnetic field sensors per permanent magnet element, these are offset in the longitudinal direction, so that when there is a plurality of permanent magnet elements, they are offset from one another along the transverse axis, so that various magnetic field sensors may be assigned to various permanent magnet elements. Due to the offset in the longitudinal direction it is possible to achieve the result that one permanent magnet element having a plurality of pole transitions, for example, may influence a plurality of magnetic field sensors situated in the same path.

At least one of the permanent magnet elements (or the single permanent magnet element) may have more than one pole transition. This permanent magnet element having more than one pole transition may be assigned to one magnetic field sensor or preferably a plurality of magnetic field sensors. There is thus a plurality of magnetic field sensors in the same path, which is defined by the movement of the permanent magnet element or of the associated pole transitions and which extends in the longitudinal direction of the permanent magnet elements.

The permanent magnet elements are preferably made of a magnetic material having a high coercive field strength, i.e., a hard magnetic material. The magnetic field sensors are preferably sensors which detect the sign of the field, i.e., are able to differentiate the south pole from the north pole. The magnetic field sensors are preferably Hall sensors, which output at least one signal corresponding to a plus or minus sign, reflecting the type of polarity (south pole or north pole).

The magnetic transducer configuration may include a soft magnetic carrier; alternatively, a hard magnetic carrier which is premagnetized may also be provided. Additional specific embodiments provide for the carrier to be made of a nonmagnetic material, for example, plastic, preferably injection-molded plastic, to attach the individual permanent magnet elements to one another. The carrier is in turn connected via a linear bearing to the magnetic field sensor array. In the case of a soft (or hard) magnetic carrier, it is situated on the side of the at least one permanent magnet element, which is facing away from the magnetic field sensor array. Thus, there is only an air gap between the magnetic transducer configuration and the magnetic field sensor array, so that the carrier is provided outside of an exterior of the position sensor.

BRIEF DESCRIPTION OF THE DRAWINGS

FIG. 1 shows a first embodiment of a magnetic transducer configuration according to the present invention.

FIG. 1.1 shows a side view of the magnetic transducer configuration.

FIG. 1.2 shows a perspective top view of the magnetic transducer configuration according to FIGS. 1 and 1.1.

FIG. 2 shows the course of the pole transition in a permanent magnet element of the magnetic transducer configuration according to the present invention.

DETAILED DESCRIPTION OF THE EXAMPLE EMBODIMENTS

Figure 3:
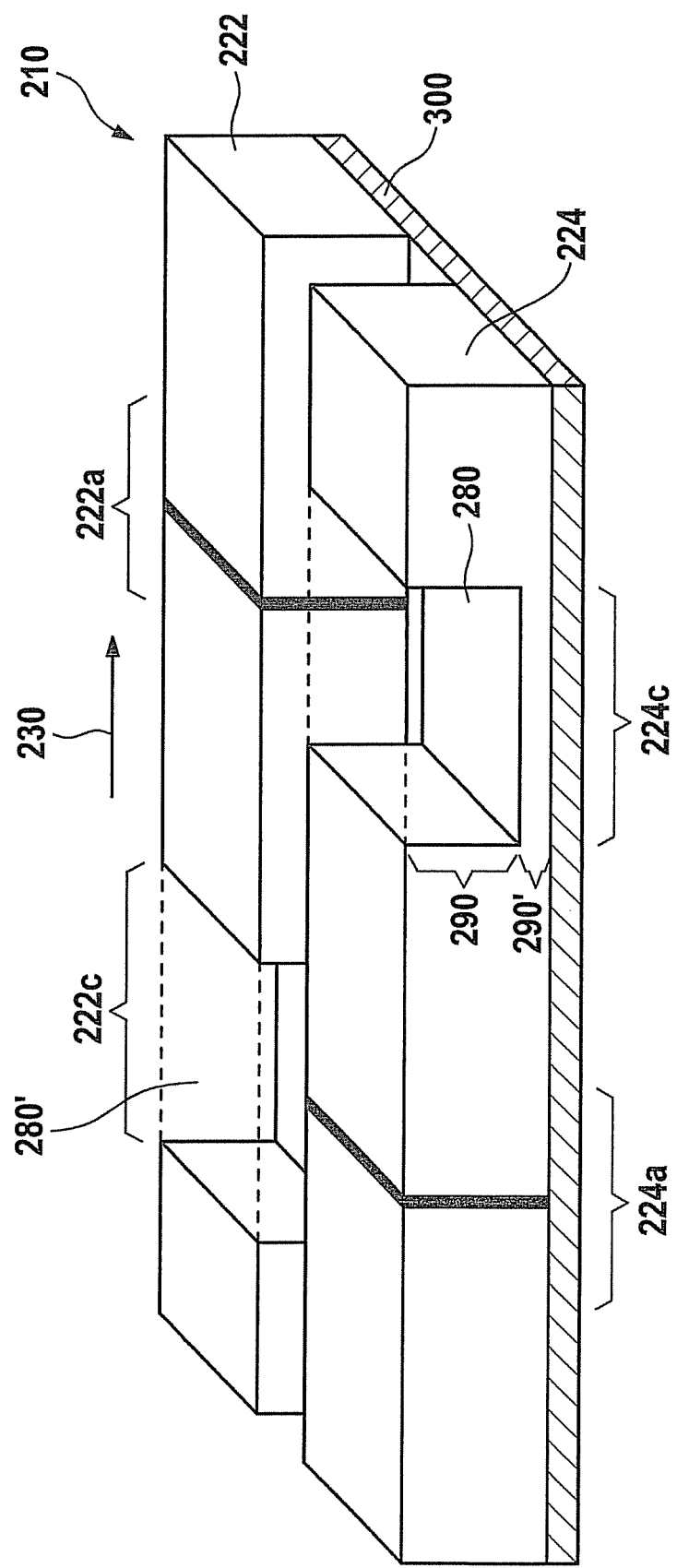
FIG. 3 shows a second embodiment of the magnetic transducer configuration according to the present invention.

FIG. 1 shows a magnetic transducer configuration 10 having four permanent magnet elements 20, 22, 24 and 26. Permanent magnet elements 20 and 26, i.e., the outer permanent magnet elements, are provided with a constant cross section (at least having a constant width) and thus correspond to the conventional permanent magnet elements. However, permanent magnet elements 22 and 24 have sections 22a, 22b, 24a, 24b, the width of which is increased in comparison with the remaining sections. The remaining sections have a constant width, which is smaller than the width in the pole transition of longitudinal sections 22a,b, 24a,b. The pole transition of the longitudinal sections of magnet element 22 are offset from one another in longitudinal direction 30 of the permanent magnet elements, so that the section of the pole transition of longitudinal section 24b having the greatest width of the pole transition of longitudinal section 24b is opposite a section 22c of permanent magnet element 22, which does not have an increased width. This results in complementary courses of the widths (in general: the cross-sectional areas or thicknesses), which means that because of the offset in longitudinal direction 30, the permanent magnet elements according to the present invention need not additionally be offset in the transverse direction of magnetic transducer configuration 10, despite the increased width. In areas outside of the pole transition of the longitudinal section, the permanent magnet elements may also be designed to be narrower than is the case in the related art. The greatest width within the pole transition of the longitudinal section is preferably at the pole transition itself and amounts to, for example, 1.3, 1.5, 2.0, 2.2, 2.5, 2.8 or 3 times the width of the permanent magnet element outside of the pole transition of the longitudinal section. The course of the width or the cross section within the pole transition of longitudinal section 22a,b, 24a,b may correspond to a circular section or to a softer course, where the derivation of the course according to the length preferably does not have any sudden changes.

FIG. 1.1 shows a side view of the magnetic transducer configuration according to the diagram in FIG. 1. FIG. 1.1 shows that magnetic transducer configuration 10 has a magnetic transducer 12, which is movable perpendicularly to the plane of the figure according to movement directions 14. The diagram according to FIG. 1.1 also shows that a number of magnetic field sensors 16 is embedded in magnetic transducer configuration 10 or guide 18. These lie in magnetic transducer configuration 10 on one side of the magnetic transducer, which is movable perpendicularly to the plane of the figure in movement direction 14. FIG. 1.2 shows a perspective top view of the magnetic transducer configuration according to FIGS. 1 and 1.1.

FIG. 1.2 shows that magnetic transducer configuration 10 is designed as a guide 18, which surrounds magnetic transducer 12, so that the magnetic transducer is movable in movement directions 14 according to the double arrow shown in FIG. 1.2. A number of magnetic field sensors 16 of a magnetic field sensor array 28 is assigned to the permanent magnet elements 22 and 24 provided according to the present invention, as shown in the diagram in FIG. 1. As already shown in the sectional diagram according to FIG. 1.1, the magnetic field sensors 16 are embedded into the material from which guide 18 is manufactured. It is apparent from the diagrams according to FIGS. 1.1 and 1.2 that magnetic field sensor array 28 includes a number of individual magnetic field sensors 16 which is brushed over by magnetic transducer 12 which is movable in movement directions 14.

FIG. 1.2 additionally shows that guide 18 of magnetic transducer configuration 10 extends around the carriage-type magnetic transducer 12, which is movable generally in the horizontal direction along magnetic transducer configuration 10.

FIG. 2 shows a pole transition of longitudinal section 140 having sections 150, 150' connected thereto being shown with a solid line, in which the width is constant. The course of the pole transition is represented with line 160 as an example. Due to external influences 170, for example, due to neighboring permanent magnet elements, the course of pole transition 160 is distorted in the longitudinal direction at the boundary areas. Due to the flow bundling by the magnetic material, however, the result is a span or a wide area 160a in which the pole transition runs generally perpendicularly to the longitudinal direction as intended. Area 160a of the pole transition is less distorted due to the bundling effect of the magnetic material of the permanent magnet element, because external fields 170 there cause less distortion of the magnetization. Entire wide area 160a is thus suitable for being situated opposite to a magnetic transducer, so that an offset in the transverse direction within area 160a does not constitute an exacerbation of the position detection accuracy. An offset within course area 160a does not result in an error in the longitudinal direction because the pole transition there runs essentially perpendicularly to the longitudinal direction.

To illustrate the effect achieved by the example embdiment of the present invention, a conventional permanent magnet element is shown with dotted lines. This has a constant cross section and thus also has a constant width. It is apparent here that instead of pole transition 160' which is also shown with dotted lines, external field effects 170 again cause distortion of the pole transition in the longitudinal direction of the permanent magnet element in the boundary area. However, the distorted boundary area is generally the same size as in the present invention, so only a very narrow area remains where the pole transition is not distorted by external field 170. Therefore, it is important to hit precisely this area through the arrangement of the sensor element; any deviation results in an error in the position detection due to the distorted boundary areas.

Based on FIG. 2, it is also possible to see that in an enlargement of the thickness within the pole transition of the longitudinal section, external fields 170 distort only a smaller boundary area due to the larger quantity of material (i.e., material longitudinal layer) at the location of the pole transition since due to the greater layer of material at the pole transition, there is also greater bundling of the magnetization of the permanent magnet, so that the influence of external interference 170 is reduced. This is true in general of an enlarged cross section at the location of the pole transition, the magnetization at the pole transition being more stable due to the greater density of material or the greater layer of material and is influenced less by external fields than would be the case if the cross section were enlarged at this location.

The enlargement of the cross section over the entire length, which is equivalent to a larger permanent magnet element having a constant cross section, would result in an unwanted increase in size of the magnetic transducer configuration and would at the same time also increase the distorting fields (cf. FIG. 2, reference numeral 170) since neighboring permanent magnet elements also create a greater magnetic flux. Accordingly, the present invention may also be seen in that a large cross section (a large width) is used only at the pole transition or in the pole transition of the longitudinal section, whereas areas outside of the pole transition of the longitudinal section have a smaller width and a smaller cross section, so that areas outside of the pole transition of the longitudinal section also generate an interfering magnetic field to a lesser extent, as represented by field 170 in FIG. 2. This may be implemented by tapering of sections near a pole transition (cf. FIG. 3).

The thickening at the pole transition of the longitudinal section according to the present invention, in particular at the pole transition, thus generates a higher "signal/noise ratio" where the field at the pole transition is considered to be the signal here and the field generated by the permanent magnet element outside of the pole transition of the longitudinal section is considered to be the noise and has a negative effect on the neighboring pole transitions. The smaller cross section outside of the pole transition of the longitudinal section in comparison with its own permanent magnet element or a neighboring element thus allows not only the accommodation of a wider pole transition of the longitudinal section of a neighboring permanent magnet element but also provides a reduced distortion at the critical location of a neighboring permanent magnet element (i.e., the pole transition) due to the fact that the comparatively smaller cross section or the cross section tapered toward the remaining magnet generates a smaller interfering field.

As already pointed out, either the pole transition may be intensified or there may equally be areas of neighboring magnet elements, which are near a pole transition and are provided as thinner or tapered areas. Both result in lower distortion.

FIG. 3 shows a magnetic transducer configuration 210 having two permanent magnet elements 222, 224 extending parallel to one another in a longitudinal direction. One permanent magnet element 222 has a pole transition of longitudinal section 222a in the middle of which there is a pole transition, whose course is represented by a bold line. In the same way, additional permanent magnet element 224 includes pole transition of longitudinal section 224a, in the middle of which there is a pole transition, which is also represented by a bold line. To distort the pole transition of longitudinal section 222a of permanent magnet element 222 only to a reduced extent, neighboring permanent magnet element 224 has a recess 280 at the height at which permanent magnet element 222 has the pole transition. This recess extends over a longitudinal section 224c, which is outside of the pole transition of longitudinal section 224a of permanent magnet element 224. Longitudinal section 224 having a reduced cross section is at the same height as the pole transition of longitudinal section 222a of the neighboring permanent magnet element 222. In particular the pole transition of the pole transition of longitudinal section 222a is near a location within longitudinal section 224c having a reduced cross section. In general, at least a portion of the pole transition of the longitudinal section and a portion of the longitudinal section of the neighboring permanent magnet element having the reduced cross section overlap. Preferably, however, the pole transition of a permanent magnet element 222 is located generally at the center (based on longitudinal axis 230) of a neighboring longitudinal section 224c, which has a comparatively reduced cross section.

In the case of the example in FIG. 3, the thickness of permanent magnet element 224 in longitudinal section 224c of permanent magnet element 224 outside of the pole transition of longitudinal section 224a is reduced by a reduction in thickness 290, so that a residual thickness 290' remains, ensuring the structural integrity of permanent magnet element 224. The ratio of the thickness of permanent magnet element 222 at the location of the pole transition or within the pole transition of the longitudinal section, based on residual thickness 290 of neighboring longitudinal section 224c, may be considered to be the signal/noise ratio, so that it is directly apparent that a lower distortion emanates from longitudinal section 224c due to the smaller layer of material than is the case with a neighboring section which does not have a reduced width, for example.

Permanent magnet element 224 also has a pole transition of longitudinal section 224a which is opposite to a recess 280' of permanent magnet element 222. In a complementary manner, a longitudinal section outside of the pole transition of the longitudinal section of permanent magnet element 222 is at the same height as the pole transition of longitudinal section 224a of the neighboring permanent magnet element 224 in order to have less field interference acting on the pole transition of longitudinal section 224a. Pole transitions are therefore preferably situated with complementary recesses in neighboring permanent magnet elements in which the thickness is reduced. Recesses 280, 280' may be produced by milling, for example, so that the remaining web having residual thickness 290' ensures a continuous magnetic flux within the permanent magnet element. If the web having residual thickness 290' were not present, the result would be a complete separation, and therefore two magnets, each having a north/south pole pair. The reduction in thickness at location 224c shown in FIG. 3 or in longitudinal section 222c of neighboring permanent magnet element 222 is not drawn true to scale. In particular, the side view of the recess may be V-shaped or may have any other shape.

Finally, the specific embodiment according to the present invention shown in FIG. 3 has a carrier 300 to which both permanent magnet elements 222, 224 are attached and which is either soft magnetic or nonmagnetic. In the case of a soft magnetic carrier, the ratio of the thickness of the carrier to the thickness of the permanent magnet elements is preferably such that only a small portion of the flux generated by the permanent magnets flows through carrier 300, so that the carrier does not significantly distort the desired course of flux of the permanent magnet elements.

FIGS. 1 and 3 have been provided with corresponding reference numerals for the figure elements having the same function, the reference numerals of FIG. 3 being obtained from the reference numerals of FIG. 1 by adding 200.

What is claimed is:

1. A magnetic transducer configuration comprising:
   at least two permanent magnet elements, each magnetized in its longitudinal direction and each having a plurality of pole transitions within corresponding longitudinal sections along the longitudinal direction,
   wherein each permanent magnet element has a larger cross section in the pole transition longitudinal sections than in longitudinal sections outside of the pole transition longitudinal sections, and
   wherein the permanent magnet elements are offset from each other in the longitudinal direction permitting the permanent magnet elements to be situated closer together despite the larger cross sections in the pole transition longitudinal sections.

2. The magnetic transducer configuration as recited in claim 1, wherein an area of the cross section in the pole transition of the longitudinal section is larger than an area of the cross section outside of the pole transition of the longitudinal section.

3. The magnetic transducer configuration as recited in claim 1, wherein a width of the permanent magnet element in the pole transition of the longitudinal section is larger than a width of the permanent magnet element outside of the pole transition of the longitudinal section.

4. The magnetic transducer configuration as recited in claim 1, wherein a thickness of the permanent magnet element in the pole transition of the longitudinal section is greater than a thickness of the permanent magnet element outside of the pole transition of the longitudinal section.

5. The magnetic transducer configuration as recited in claim 1, wherein the magnetic transducer configuration includes a plurality of permanent magnet elements, two neighboring permanent magnet elements of the plurality of permanent magnet elements having pole transitions of longitudinal sections offset from one another in a longitudinal direction, wherein the neighboring permanent magnet elements have longitudinal sections in which particular widths or cross-sectional areas of the permanent magnet elements have courses in the longitudinal direction that are complementary to one another, and wherein the pole transition of the longitudinal section of at least one of the neighboring permanent magnet elements lies at least partially in the longitudinal section, which has courses of the widths or cross-sectional areas complementary to one another.

6. The magnetic transducer configuration as recited in claim 1, wherein the magnetic transducer configuration includes a plurality of permanent magnets, wherein a first permanent magnet element of two neighboring permanent magnet elements of the plurality of permanent magnet elements has a pole transition in a longitudinal section, and a second of the two neighboring permanent magnet elements next to the pole transition of the longitudinal section has a longitudinal section outside of a pole transition of the longitudinal section of the second permanent magnet element, a cross-sectional area, width, or thickness of which is smaller than a cross-sectional area or thickness within the pole transition of the longitudinal section of the first permanent magnet element.

7. A magnetic position sensor, comprising:
   a magnetic field sensor array and
   a magnetic transducer configuration, the magnetic transducer configuration including at least two permanent magnet elements, each magnetized in its longitudinal direction and each having a plurality of pole transitions within corresponding longitudinal sections along the longitudinal direction,
   wherein each permanent magnet element has a larger cross section in the pole transition longitudinal sections than in longitudinal sections outside of the pole transition longitudinal sections;
   wherein the permanent magnet elements are offset from each other in the longitudinal direction permitting the permanent magnet elements to be situated closer together despite the larger cross sections in the pole transition longitudinal sections; and
   wherein the magnetic field sensor array and the magnetic transducer configuration are mounted displaceably in a longitudinal direction relative to one another in a plane-parallel manner, and the magnetic field sensor array has at least one magnetic field sensor, which is situated in a path along which the permanent magnet element moves during displacement of the magnetic transducer configuration with respect to the magnetic field sensor array.

8. The magnetic position sensor as recited in claim 7, wherein the magnetic field sensor array has a magnetic field sensor for each pole transition, the magnetic field sensor being equipped due to its arrangement in the position sensor to detect an associated pole transition.

9. The magnetic position sensor as recited in claim 7, wherein the magnetic field sensor array includes a plurality of magnetic field sensors which are offset from one another along at least one of the longitudinal direction and a direction perpendicularly to the longitudinal direction and parallel to the magnetic transducer configuration.

10. The magnetic position sensor as recited in claim 7, wherein the at least one permanent magnet element has more than one pole transition, and the magnetic field sensor array has more than one magnetic field sensor in a path along which the permanent magnet element moves during displacement of the magnetic transducer configuration with respect to the magnetic field sensor array.

11. The magnetic position sensor as recited in claim 7, wherein the magnetic field sensor is a Hall sensor.

12. The magnetic position sensor as recited in claim 7, wherein the magnetic transducer configuration includes a soft magnetic carrier which carries the at least one permanent magnet element and which is situated on one side of the at least one permanent magnet element, facing away from the magnetic field sensor array.

* * * * *